United States Patent

Nolan

[11] Patent Number: 6,050,745
[45] Date of Patent: Apr. 18, 2000

[54] WAVBRAKERSTEPS FOR WATERFRONT BULKHEADS, SEAWALLS AND SEACOAST

[76] Inventor: Don E. Nolan, 437 East Lake Sammamish Rd. SE., Redmond, Wash. 98053

[21] Appl. No.: 09/016,524

[22] Filed: Jan. 30, 1998

[51] Int. Cl.[7] .......................................................... E02B 3/06
[52] U.S. Cl. .................................. 405/33; 405/21; 405/30
[58] Field of Search ................................ 405/21, 29–35, 405/16, 15, 284, 22, 23, 25; 52/178, 179, 184, 189

[56] References Cited

U.S. PATENT DOCUMENTS

| | | | |
|---|---|---|---|
| 2,184,462 | 12/1939 | Milliken | 405/31 |
| 3,426,536 | 2/1969 | Danz | 405/32 |
| 4,080,793 | 3/1978 | Pulsifer | 405/30 |
| 4,784,521 | 11/1988 | Martin et al. | 405/31 X |
| 4,913,595 | 4/1990 | Creter et al. | 405/32 X |
| 5,378,088 | 1/1995 | Foehrkolb | 405/21 X |

*Primary Examiner*—Dennis L. Taylor

[57] ABSTRACT

WavBrakerSteps is a hydrodynamic structure comprising a main form (20, 22, 24, 26), a series of inclined upward ramped steps in the shape of a sine wave curve. WavBrakerSteps redirect and dissipate the relentless attacks by energizes and forces of sea waves, wind waves, tidal forces, ship and boat wakes. These energies and forces scour and erode the base or toe, the supporting structures, of waterfront bulkheads, seawalls and seacoasts. The action by waves flowing upward and then downward over the inclined, curved and ramped WavBrakerSteps prevents undercutting, undermining and sinking from occurring. These natural actions protect the beach environment.

11 Claims, 9 Drawing Sheets

WAVBRAKERSTEPS FOR WATERFRONT BULKHEADS, SEAWALLS AND SEACOAST

BACKGROUND

1. Field of Invention

This invention relates to waterfront bulkheads, seawalls and seacoasts, specifically improving the protection at the base or toe from energies and forces of sea's, scouring, erosion, undercutting and undermining. These forces result in damage and failures causing many dollars of damage and property loss every year.

2. Background

Waterfront bulkheads, seawalls and seacoasts have a dynamic problem of relentless attacks by energies and forces of sea waves, wind waves, tidal forces, ship and boat wakes. These energies and forces scour and erode the base or toe, the supporting structures, of waterfront bulkheads, seawalls and seacoasts. CIRIA Report TN 125 (Seawalls: Survey of Performance and Design Practice (1986)) states that toe erosion is the most common cause of seawall failure. Tides position the waves at the venerable areas and wave overtopping causes hydraulic actions and pressures on waterfront bulkheads, seawalls and seacoasts. These forces and actions cause damage, collapse and failure of waterfront bulkheads, seawalls and seacoasts.

Riprap, large rocks, can be used, but they also are eroded, undercut, displaced and sink into the beach.

The toe or base can be extended deeper beneath the beach level to prevent future failure. This increases the cost and requires more expensive construction. However, it is just a matter of time before the toe is eroded, undermined and fails.

Stairs can be used. The form is similar to that used by standard building codes. The standard run and rise with or without nosing also are eroded, undermined and fail.

3. (Amended). Prior Art.

U.S. Pat. No. 2,184,462, Milliken, a vertical bulkhead or sea wall having a series of recesses with curved sides and apices. My invention is physically different, it is a structure comprising a plurality of main sections placed parallel to each other along the beach to define a sine wave, each main section comprising a plurality of sections having an axis which extends along and parallel to the beach, each said section having a series of inclined upward ramped steps which form a portion of said sine wave along the axis of the sections, said sections being placed adjacent each other along the beach with said sine wave facing the incoming waves.

U.S. Pat. No. 3,426,536, Danz, a vertical interwoven barrier. My invention is physically different, it is a structure comprising a plurality of main sections placed parallel to each other along the beach to define a sine wave, each main section comprising a plurality of sections having an axis which extends along and parallel to the beach, each said section having a series of inclined upward ramped steps which form a portion of said sine wave along the axis of the sections, said sections being placed adjacent each other along the beach with said sine wave facing the incoming waves.

U.S. Pat. No. 4,080,793, Pulsifer, interconnected vehicular tires forming a vertical step-shaped earth water interface. My invention is physically different, it is a structure comprising a plurality of main sections placed parallel to each other along the beach to define a sine wave, each main section comprising a plurality of sections having an axis which extends along and parallel to the beach, each said section having a series of inclined upward ramped steps which form a portion of said sine wave along the axis of the sections, said sections being placed adjacent each other along the beach with said sine wave facing the incoming waves.

U.S. Pat. No. 4,784,521, Martin et al, an ocean diversion wall with inclining surface and curved cup surface. My invention is physically different, it is a structure comprising a plurality of main sections placed parallel to each other along the beach to define a sine wave, each main section comprising a plurality of sections having an axis which extends along and parallel to the beach, each said section having a series of inclined upward ramped steps which form a portion of said sine wave along the axis of the sections, said sections being placed adjacent each other along the beach with said sine wave facing the incoming waves.

U.S. Pat. No. 4,913,595, creter et al, a triangular prismatic shaped shoreline break water. My invention is physically different, it is a structure comprising a plurality of main sections placed parallel to each other along the beach to define a sine wave, each main section comprising a plurality of sections having an axis which extends along and parallel to the beach, each said section having a series of inclined upward ramped steps which form a portion of said sine wave along the axis of the sections, said sections being placed adjacent each other along the beach with said sine wave facing the incoming waves.

U.S. Pat. No. 5,378,088, Foehrkolb, a vertical retaining wall using segmented automobile tires. My invention is physically different, it is a structure comprising a plurality of main sections placed parallel to each other along the beach to define a sine wave, each main section comprising a plurality of sections having an axis which extends along and parallel to the beach, each said section having a series of inclined upward ramped steps which form a portion of said sine wave along the axis of the sections, said sections being placed adjacent each other along the beach with said sine wave facing the incoming waves.

Objects and Advantages

Nature's beaches dissipate the energies and forces of seawaves, wind waves, tidal forces, ship and boat wakes with a natural plane, the upward runout of the beaches' contours.

WavBrakerSteps solve the hydrodynamic problem of erosion, undermining, sinkholes, collapse and failure at the base or toe of waterfront bulkheads, seawalls and seacoasts. WavBrakerSteps cause a hydrodynamic flow, working with nature, in a similar manner like nature's beaches. WavBrakerSteps dynamically redirect and dissipate the attacking wave energies and forces. WavBrakerSteps are a series of inclined upward ramped steps in the form of a sine wave curve. The inclined upward ramped steps redirect and dissipate the wave energies and forces. The face of each step is inclined backward from the bottom. The sine wave curve allows for the attacking waves to be redirected and dissipated when approaching from any direction. WavBrakerSteps are formulated and designed to allow the natural buildup of organic and inorganic beach materials. The action by waves flowing upward and then downward over the inclined, curved and ramped WavBrakerSteps prevents undercutting, undermining and sinking from occurring. The natural actions of WavBrakerSteps allow the plants and animals to function in their natural environment. WavBrakerSteps are designed and constructed in a durable precast form using reinforced concrete. Other appropriate building materials may be used. WavBrakerSteps may be interlocking and attached to each other, to the beach, to waterfront bulkheads, to seawalls and to seacoasts. WavBrakerSteps are precast and may be installed at low tide. This type of installation works with nature protecting and preventing contamination to the environment. Critical testing has established the effectiveness of WavBrakerSteps.

REFERENCE NUMERALS IN DRAWINGS

20 Convex Left Center WavBrakerSteps Section.
22 Convex Right Center WavBrakerSteps Section.
24 Concave Right Middle WavBrakerSteps Section.
26 Concave Left Middle WavBrakerSteps Section.
28 Left End WavBrakerSteps Form
30 Right End WavBrakerSteps Form
32 Left Side Interlocking Forms (Convex Center WavBrakerSteps Form)
34 Rear Side Interlocking Forms (Convex Center WavBrakerSteps Form)
36 Right Side Interlocking Forms (Convex Center WavBrakerSteps Form)
40 Bottom Side Interlocking Forms (Convex Center WavBrakerSteps Form)
42 Left Side Interlocking Forms (Concave Middle WavBrakerSteps Form)
44 Right Side Interlocking Forms (Concave Middle WavBrakerSteps Form)
46 Rear Side Interlocking Forms (Concave Middle WavBrakerSteps Form)
48 Bottom Side Interlocking Forms (Concave Middle WavBrakerSteps Form)
50 Wave Director Form (Golden Proportion Shape)
52 Side View of Inclined, Curved Ramped Steps.

SUMMARY

WavBrakerSteps is a hydrodynamic structure comprising a series of inclined upward ramped steps in the shape of a sine wave curve. WavBrakerSteps redirect and dissipate the relentless attacks by energies and forces of sea waves, wind waves, tidal forces, ship and boat wakes. These energies and forces scour and erode the base or toe, the supporting structures, of waterfront bulkheads, seawalls and seacoasts. The action by waves flowing upward and then downward over the inclined, curved and ramped WavBrakerSteps prevents undercutting, undermining and sinking from occurring.

DESCRIPTION—FIGS. 1 TO 9

Figure 1:
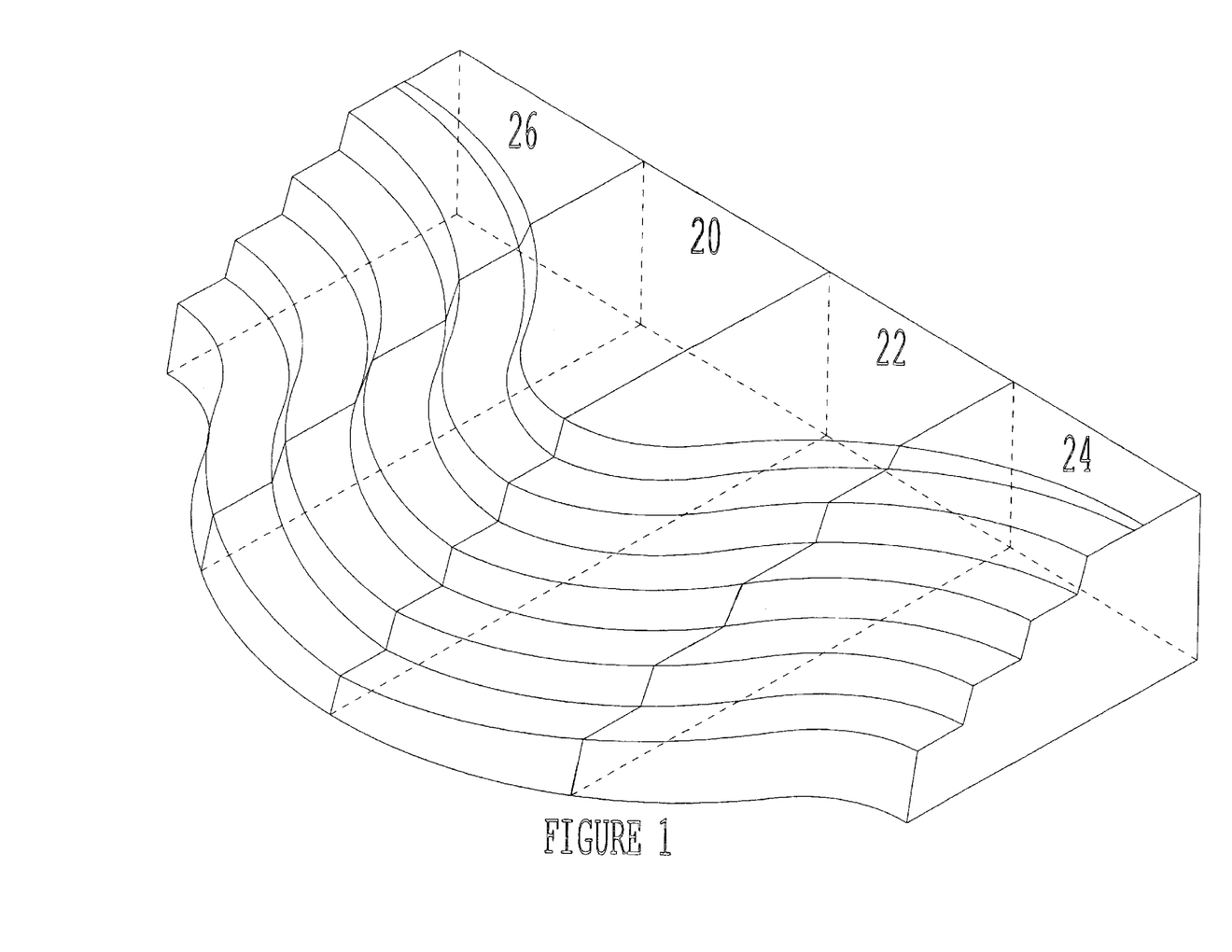
FIG. 1 show the main form of WavBrakerSteps.
Figure 2:
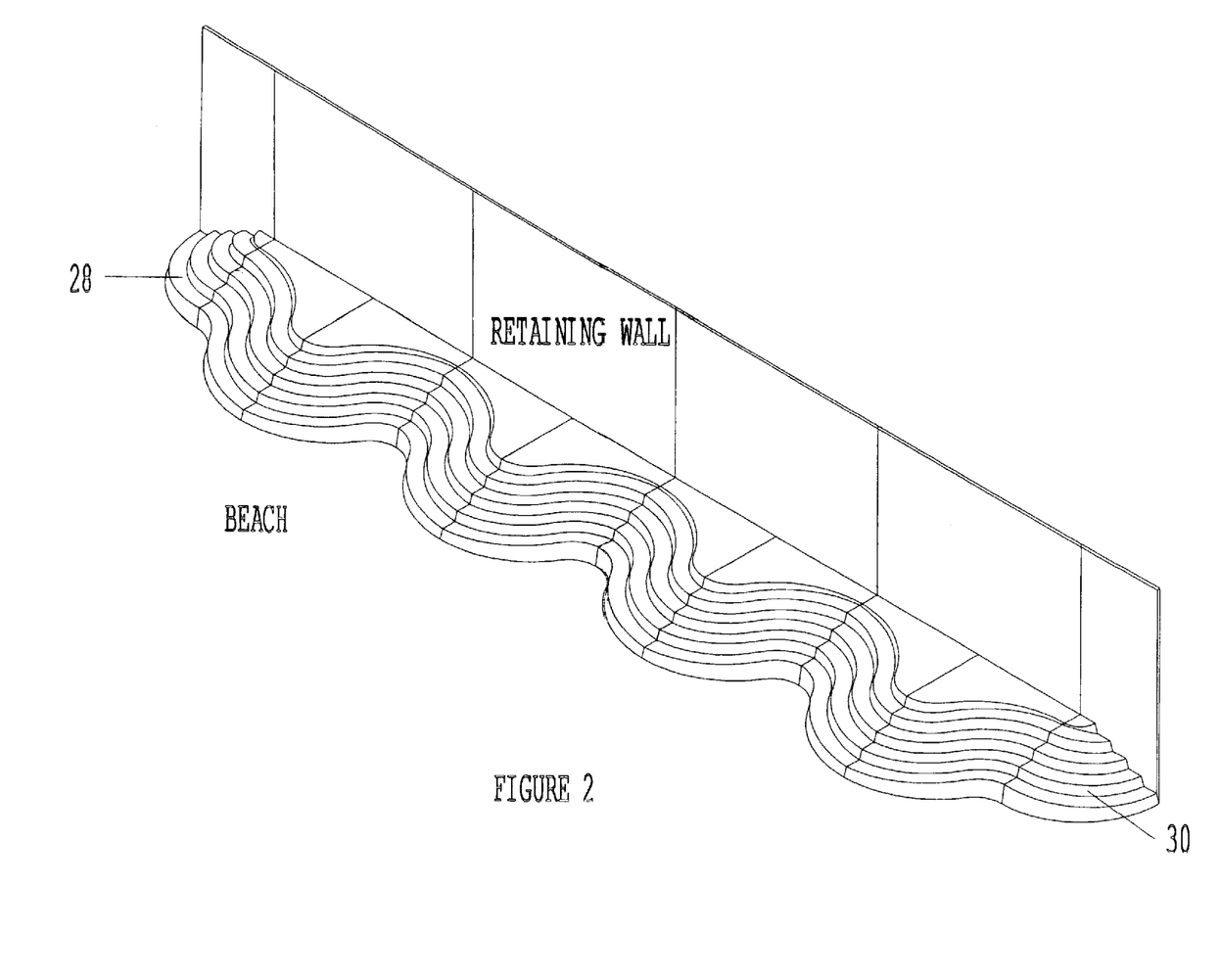
FIG. 2 show several main forms placement with end forms against a seawall toe.

The WavBrakerSteps main form is made up of four sections, a left and right convex WavBrakerSteps center section joined with a concave right middle WavBrakerSteps section and concave left middle WavBrakerSteps section which is presented in FIG. 1. The inclined upward ramped steps are positioned in the shape of a sine wave curve. The inclined, curved, upward ramped steps begin at the center of the convex center WavBrakerSteps form and continue upward to the next step level at the outside edge of the main form. The height and width of the steps is in proportion to the hydrodynamic wave forms at a particular site. The inclined front face of the step is sloped backward from the bottom of each step FIG. 9. The number of WavBrakerSteps required is determined by the height of the required bulkhead or seawall. Several WavBrakerSteps main forms are connected together with end forms and presented in FIG. 2.

Figure 3:
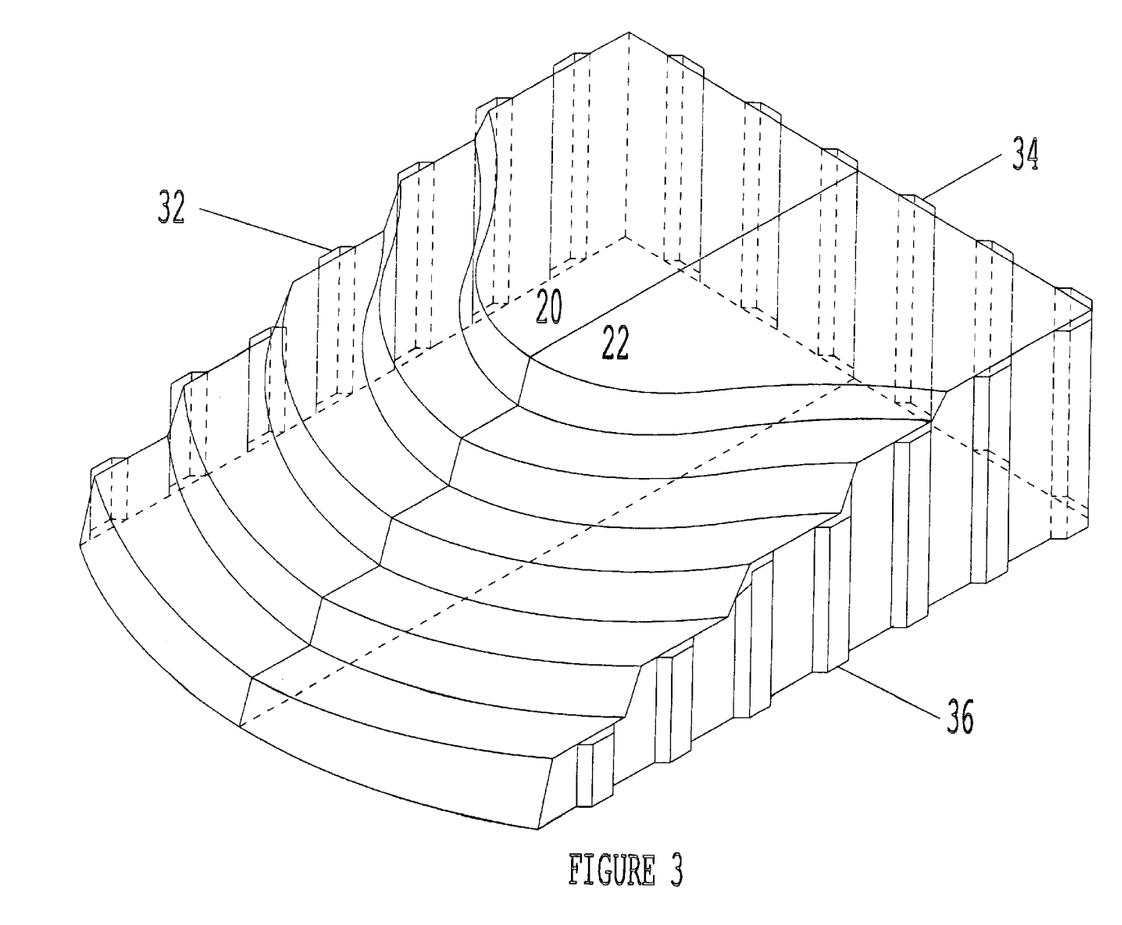
FIG. 3 show convex center section with interlocking forms right, left and rear.
Figure 4:
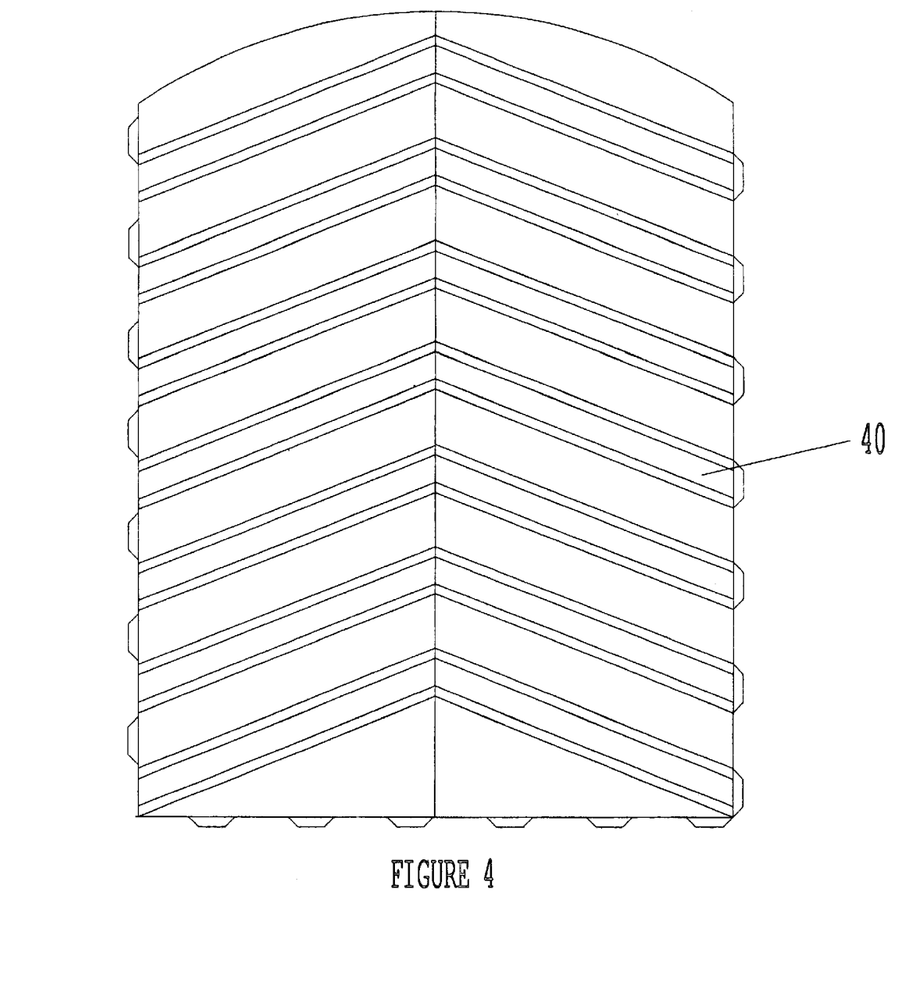
FIG. 4 show bottom of convex center section with interlocking forms.
Figure 5:
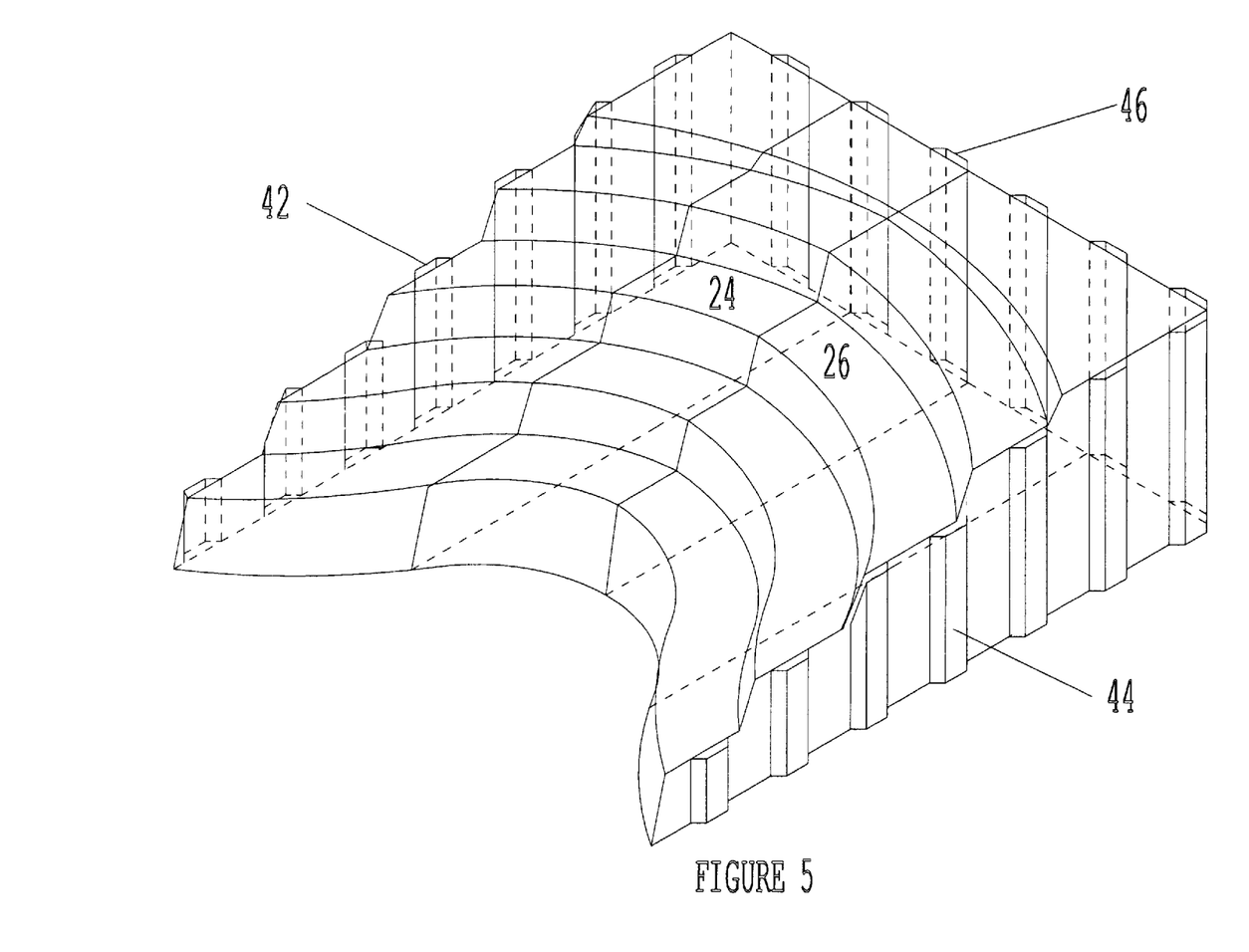
FIG. 5 show concave middle section with interlocking forms right, left and rear.
Figure 6:
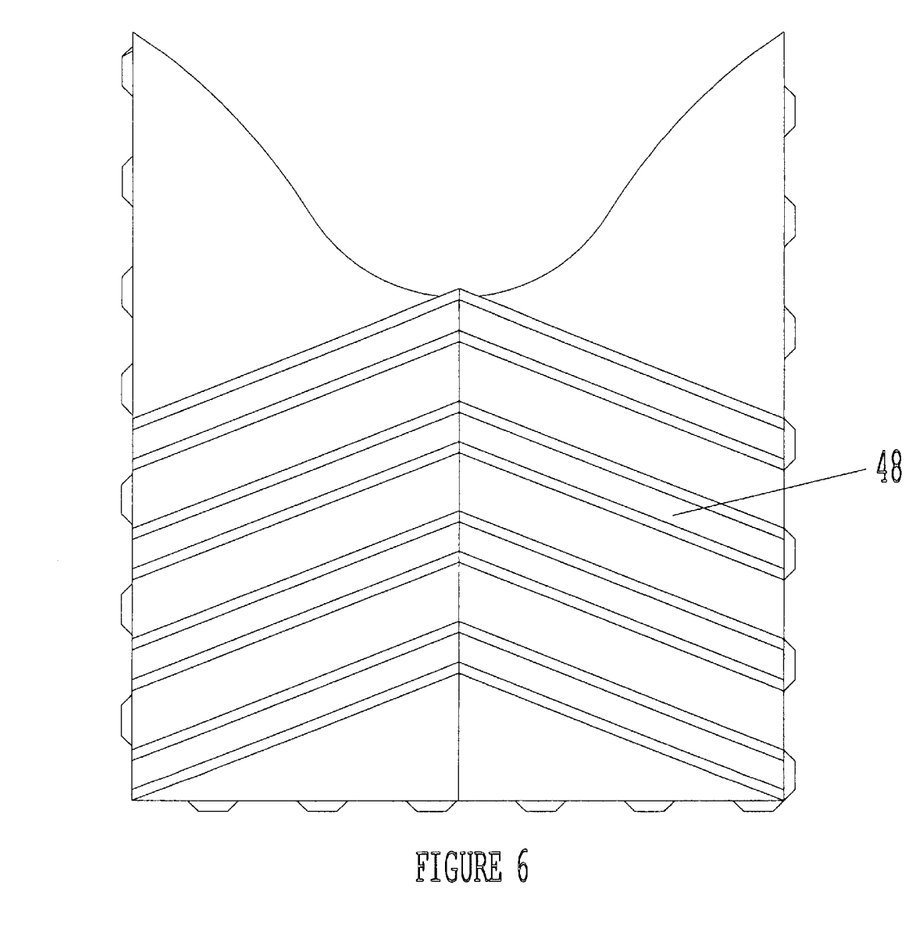
FIG. 6 show bottom of concave section with interlocking forms.
Figure 7:
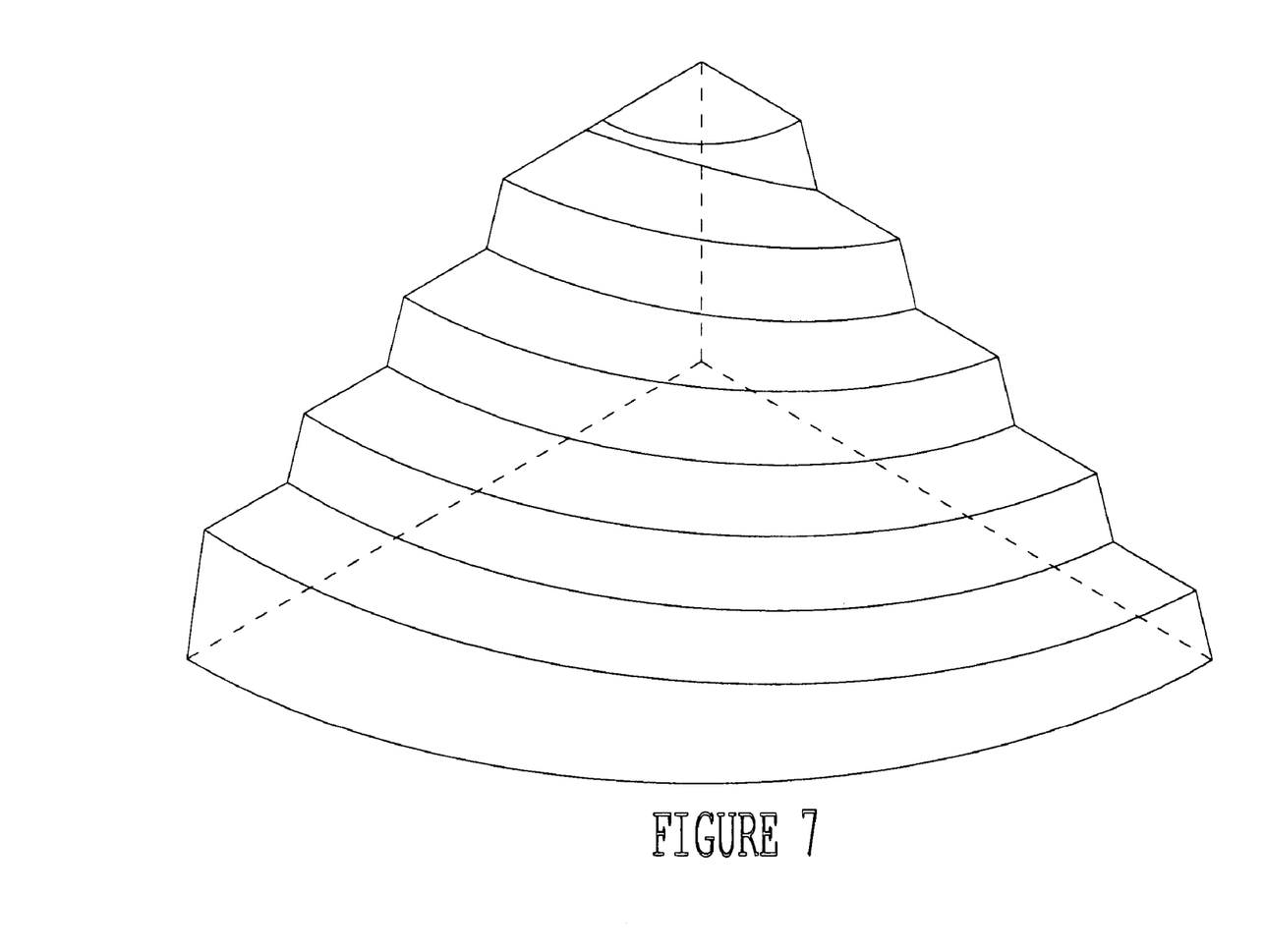
FIG. 7 show right end of WavBrakerSteps without interlocking forms.

WavBrakerSteps have a convex center form FIG. 3 and a concave middle form FIG. 4. These forms are placed and may be interlocking with the each other, the waterfront bulkhead, seawall, seacoast and the beach. A convex center form FIG. 3 is positioned next to a concave middle form FIG. 5 and this sequence is repeated for the length of the bulkhead or seawall. The same type of interlocking may be used on the back of the WavBrakerSteps forms, also the bottom may be formed with interlocking against the beach FIG. 4 and 6. The WavBrakerSteps right end form is presented in FIG. 7. The sides, the back and the bottom may be interlocked with adjoining sections, seawall and beach FIG. 3, 4, 5 and 6. At the left end of WavbrakerSteps is a mirror image of the right end form.

Figure 8:
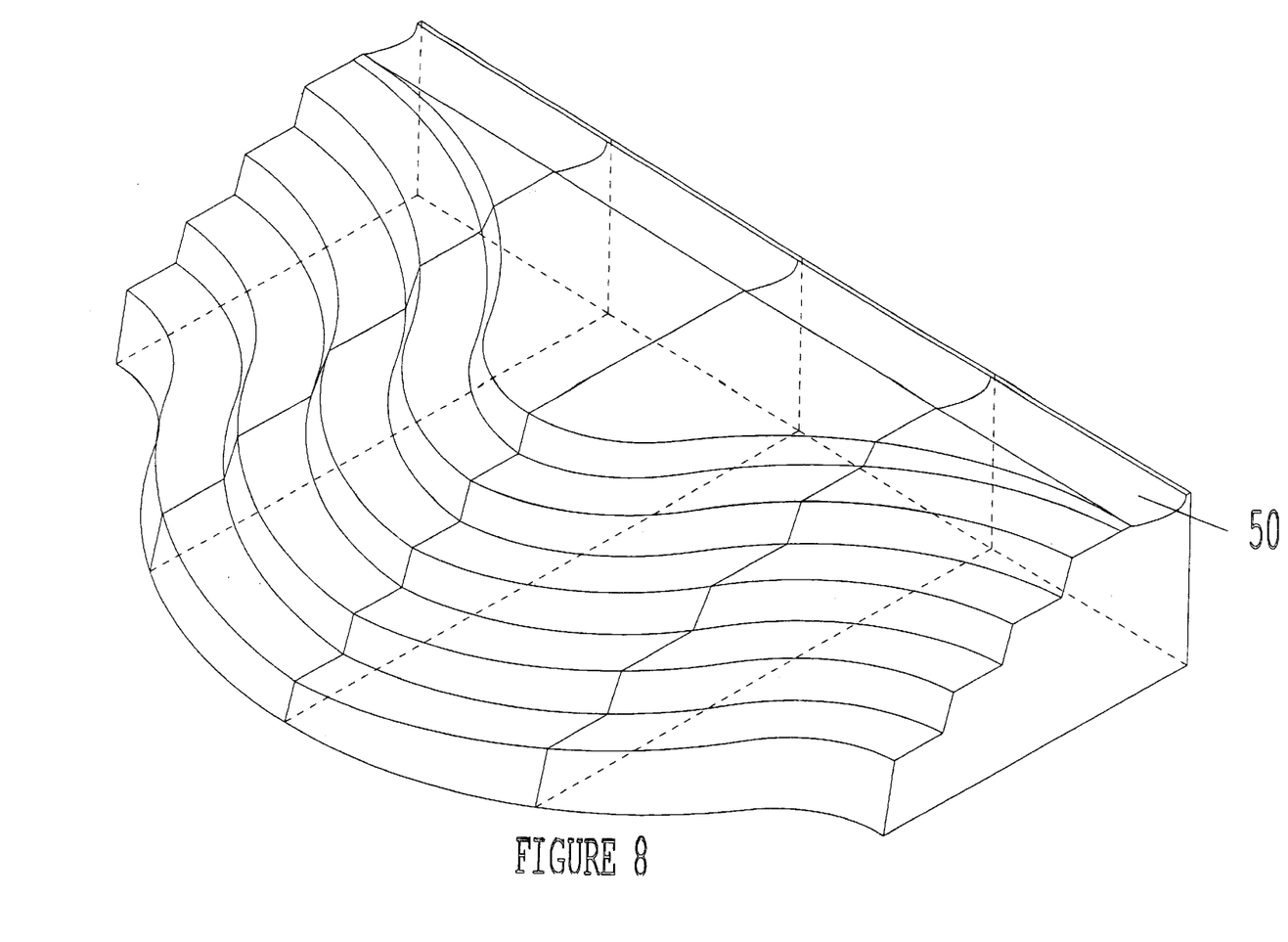
FIG. 8 show main form with top wave director.
Figure 9:
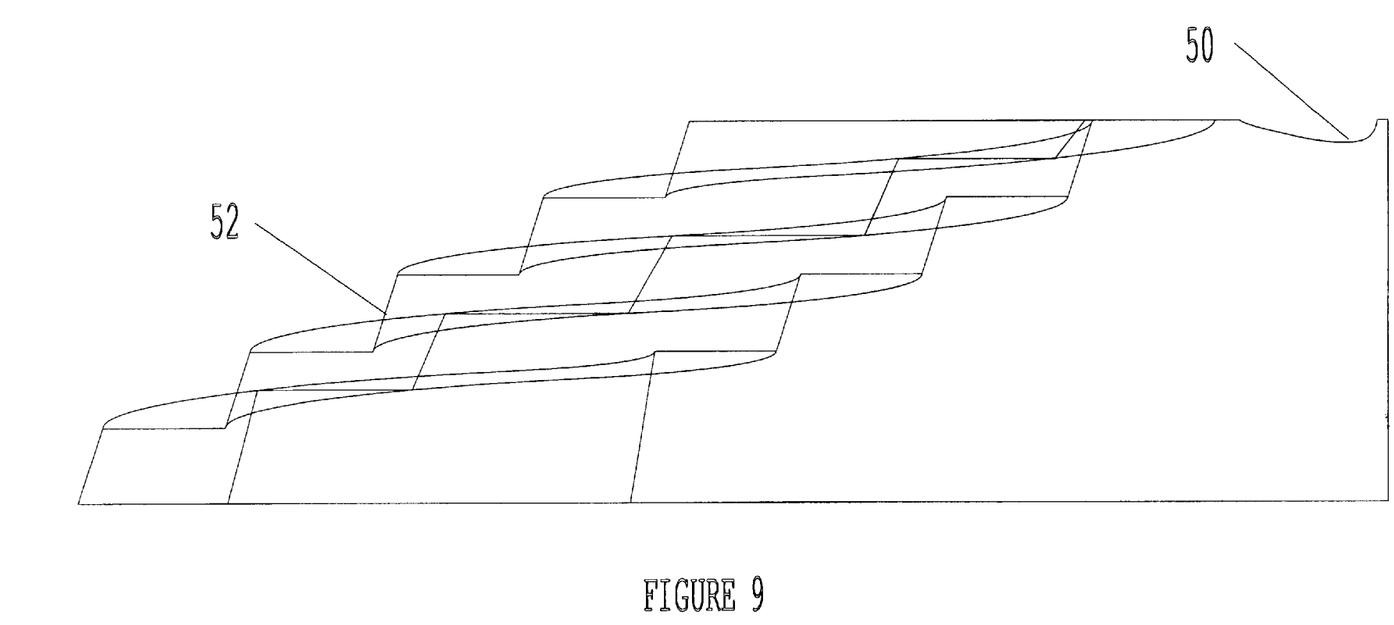
FIG. 9 show side view of inclined, curved upward ramped steps.

A wave director redirects the incoming wave FIG. 8. The shape of the wave director guides the incoming wave upward, redirecting and dissipating the hydrodynamic energies and forces. This redirecting relieves hydraulic pressure from the waterfront bulkheads, seawalls and seacoast.

(Amended). Although the present invention has been described in conjunction with preferred embodiments, it is to be understood that modification and variations may be resorted to without departing from the spirit and scope of the invention, as those skilled in the art will readily understand. Such modifications and variations are considered to be within the spirit and scope of the invention and appended claims.

I claim:

1. A hydrodynamic structure placed on the beach, parallel to the shoreline, at the base or toe of waterfront bulkheads, sea walls, and seacoasts to prevent erosion due to wave action, said structure comprising a plurality of main sections placed parallel to each other along the beach to define a sine wave, each main section comprising a plurality of convex and concave sections having an axis which extends along and parallel to the beach, each said section having a series of inclined upward ramped steps which form a portion of said sine wave along the axis of the sections, said sections being placed adjacent each other along the beach with said sine wave facing the incoming waves.

2. The hydrodynamic structure of claim 1 wherein said inclined upward ramped steps are sloped backward from the bottom of each step.

3. The hydrodynamic structure of claim 1 wherein at least some of the inclined upward ramped steps are sloped upward from the center of the main section continuing to the next step level at the outside edge of the main section.

4. The hydrodynamic structure of claim 1 wherein at least some of said convex sections are interlocked to the sides of said concave sections.

5. The hydrodynamic structure of claim 1 wherein the backs of at least some of said convex sections and concave sections are interlocked with the waterfront bulkhead, seawall or seacoast.

6. The hydrodynamic structure of claim 1 wherein the bottoms of at least some of the convex sections and concave sections are interlocked with the beach.

7. The hydrodynamic structure of claim 1 wherein the top of at least some of the convex sections and concave sections are formed with a curved wave director.

8. The hydrodynamic structure of claim 1 wherein the ends of the sections are formed to continue the shape and flow of adjacent sections.

9. The hydrodynamic structure of claim 1 wherein the end of each section is interlocked to the end of an adjacent section.

10. The hydrodynamic structure of claim 1 wherein the ends of the sections are interlocked with the waterfront bulkhead, seawall or seacoast.

11. The hydrodynamic structure of claim 1 wherein the bottoms of the sections are interlocked with the beach.

* * * * *